Oct. 2, 1951 W. K. DOW 2,569,660
MEASURING AND GAUGING DEVICE
Filed Feb. 3, 1948
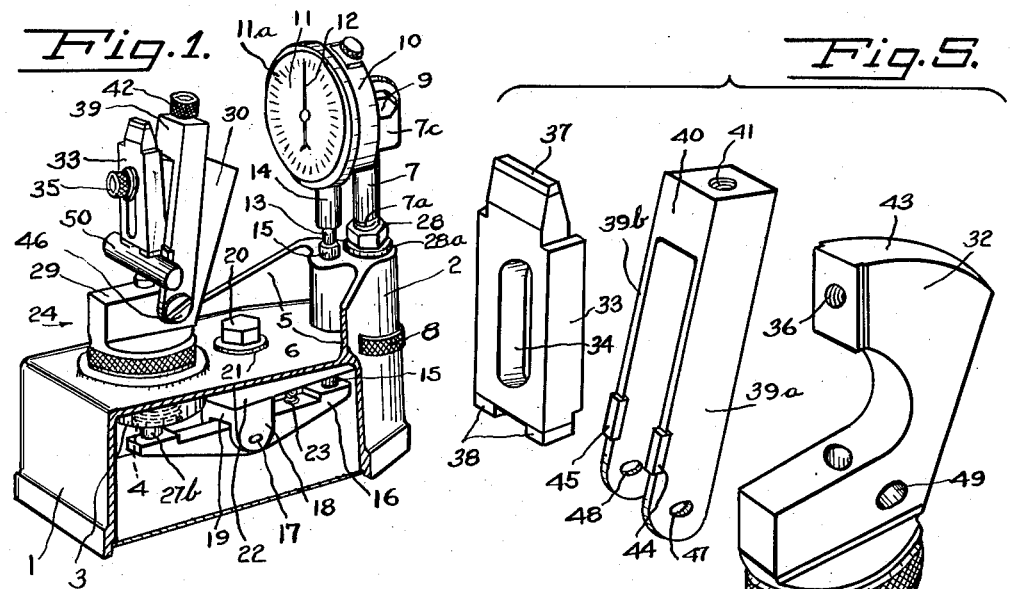
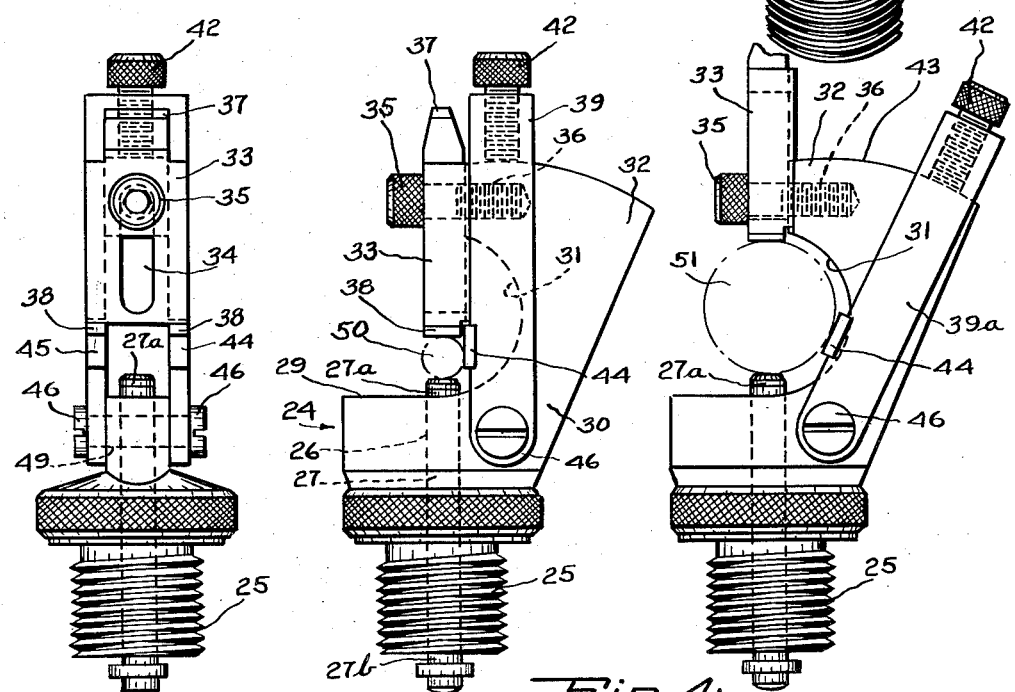
INVENTOR.
WALTER K. DOW
BY
Raymond A. Paquin
ATTORNEY.

Patented Oct. 2, 1951

2,569,660

UNITED STATES PATENT OFFICE 2,569,660

MEASURING AND GAUGING DEVICE

Walter K. Dow, Longmeadow, Mass.

Application February 3, 1948, Serial No. 5,959

7 Claims. (Cl. 33—147)

This invention relates to new and useful improvements in devices for use in gauging or measuring the dimensions of molded or formed parts and has particular reference to new and improved means whereby the device disclosed in my prior application, Serial Number 719,836, filed January 2, 1947, may be adapted for measuring or gauging such dimensions as external diameters and which may be easily and quickly adjusted or adapted for use in gauging or measuring parts of different sizes.

An object of the invention is to provide a device of the type set forth which may be easily and quickly adjusted or adapted for use in measuring or gauging different size parts.

Another object of the invention is to provide a new and improved device of the type set forth whereby the device set forth in my prior application, noted above, may be adapted for use in checking external dimensions.

Another object of the invention is to provide a device of the type set forth which is relatively simple and economical in construction yet efficient in operation.

Another object of my invention is to provide a device of the type set forth which allows the gauging or checking of the external dimensions of parts with which gauge blocks may be used for accurate or precise setting of the measuring parts quickly and easily to desired dimensions for comparison with external dimensions of formed or molded parts.

Another object of my invention is to provide a new and improved device for use in the accurate gauging or control of dimensions in the manufacture of numerous similarly formed parts where it is necessary for the accurate control of the dimensions of such parts.

Another object of my invention is to provide a relatively inexpensive, highly accurate gauging means for external dimensions.

Another object of my invention is to provide a universal stage or support whereby a multiplicity of similar parts may be checked easily and quickly and whereby the stage or support may be easily and quickly adjusted for the checking of parts of various dimensions.

Other objects and advantages of the invention will be apparent from the following description taken in connection with the accompanying drawing. It will be understood that changes may be made in the details of construction and arrangement of parts without departing from the scope of the invention as expressed in the accompanying claims. I, therefore, do not wish to be limited to the exact details of construction and arrangement of parts shown and described, as the preferred form has been given by way of illustration only.

Referring to the drawing:

Fig. 1 is a perspective view, partly in section, and showing a measuring or checking device embodying the invention;

Fig. 2 is a front or face view of the stage or support illustrated in Fig. 1;

Fig. 3 is a side view of the device shown in Fig. 2;

Fig. 4 is a view similar to Fig. 3 but showing the device adjusted for a different size object; and Fig. 5 is an exploded view showing the various elements of the device shown in Figs. 2 to 4 inclusive.

Referring more particularly to the drawings wherein similar reference characters designate corresponding parts throughout the several views, the device shown in Fig. 1 embodying the invention comprises the base support 1 having the elevated end portion 2 adjacent one end thereof and having the depending portion or flange 3 disposed interiorly of the base 1 adjacent the opposite end thereof from the portion 2 and the portion 3 is internally screw threaded at 4. The elevated end 2 of the base support 1 is connected by the tapered side walls 5 with the substantially horizontally extended portion 6 of the base support 1 and the elevated end 2 of the base 1 is provided with a vertically extending aperture adapted to receive a support rod 7 having a screw threaded shank 7a which extends into the aperture in the portion 2 and said rod 7 is adapted to be adjustably positioned in the base 1 and portion 2 by the knurled adjustment nut 8 which projects through a slot in the end 2 of the base 1.

The support 7 may thus be adjusted vertically to various positions. The upper extremity of the support 7 carries a yoke portion 7c which has a transverse aperture to receive the screw threaded securing bolt 9 which bolt has a threaded portion engaging a corresponding threaded portion in the aperture in the yoke 7c. The bolt 9 passes through a projecting portion formed on the casing 10 of the indicator. The indicator 11 includes a calibrated scale and a rotatable indicator hand 12 which is angularly movable thereover in accordance with the movement of the indicator actuator pin 13 which extends through the protective sleeve 14 for connecting the end of the indicator actuator pin 13 to the end of the vertically movable indicator pin 15 which engages the indicator actuator pin 13 at its upper end and is disposed for slidable movement in a vertically arranged aperture in the base support 1 and has its opposite end engaging the end face of the pivotally mounted lever 16. The pin 15 serves as a force transfer member between pin 13 and the lever 16.

The pivotally mounted lever 16 is carried by transverse pin 17 which is journaled in bearings formed in the depending side portions 18 of the U-shaped yoke 19 which is fastened to the underside of the base 1 by means of the screw threaded bolt 20 which is tightened against washer 21 on the surface of base 1.

Beneath the surface of base 1 is provided the longitudinally extending projection 22 having an opening therein adapted to receive the compression type coil spring 23 which engages the upper surface of lever 16 at its free end and tends to continuously urge lever 16 away from projection 22.

The foregoing construction is that shown and described in my previous application, Serial Number 719,836, referred to above, to which reference is made for further disclosure thereof.

The base 1 has an opening therein aligned with the opening in the extension 3 and adapted to receive the end of the stage 24 which has the threaded portion 25 adapted to engage the threaded portion 4 on the extension 3 to secure the stage member 24 in position on the base 1.

The member 24 has the opening 26 therethrough in which is mounted the slidable pin 27 having its upper end 27a adapted to engage the surface of a piece to be checked or gauged and its lower end 27b adapted to engage the upper face of the adjacent end of the fulcrum 16 so that when pressure applied against the end 27a of pin 27 is communicated directly to the lever 16 which rocks about pivot 17 for registering measurements by movement of an indicator arm 12 over calibrated scale 11a. The position of the indicator casing 10 above the end of indicator pin 15 is controlled by movement of the knurled adjusting nut 8 to raise or lower support 7 by engagement of the internal screw threads of knurled nut 8 with the external screw threads 7a of the support 7 and when the exact operating position is found, lock nut 28 operating against washer member 28a is tightened to maintain the support 7 in the selected vertical position and compression coil spring 23 tends to continuously urge lever 16 to a position in which said lever urges pin 27 vertically upwardly.

The member 24 has the stage portion 29 through which the pin 27 projects and the member 29 is provided with the extension 30 having the cut-out or clearance 31 to allow the positioning of the device to be checked or gauged and having the overhanging portion 32 on the face of which is positioned the anvil member 33 directly in line with the end 27a of the pin 27.

The anvil member 33 has the central slot 34 through which is positioned the screw member 35 which is threaded into a threaded opening 36 in the end 32 whereby the anvil member 33 may be adjusted to desired vertical position and then locked in said adjusted position by means of the screw 35. The anvil member 33 is provided with the single wear resisting surface 37 at one end and the spaced wear resisting portions 38 at its opposite end whereby either end may be employed depending upon the article to be gauged.

The yoke stop member 39 is pivotally mounted on the member 24 adjacent the opening 26 for the pin 27.

The yoke stop member 39 has the side portions 39a and 39b connected by the portion 40 through which is formed the threaded opening 41 adapted to receive the screw or other threaded member 42 which is adapted to tightly engage the upper surface 43 of the body 32 to retain the yoke stop in adjusted position.

Each of the sides or legs 39a and 39b of the yoke stop may be provided with wear resistant portions 44 and 45 respectively and the yoke stop is adapted to be pivotally mounted on the body 32 by means of the screw or the like 46 which passes through aligned opening 47 in side 39a of the yoke stop, then through opening 49 in the body 32 and through opening 48 in the side 39b of the yoke stop to pivotally mount the yoke stop on the body 32.

The wear resistant surfaces or portions 37, 38, 44 and 45 may be carbide tipped or otherwise suitably treated to provide a wear resistant surface. This also applies to the upper portion 27a of the pin 27.

It will be seen from Figs. 3 and 4 that by adjusting the anvil 33 and yoke stop that the device may be used to check or gauge from relatively small articles such as the article 50 as shown in Fig. 3 to relatively large articles such as the article 51 shown in Fig. 4. The device is particularly adaptable for use in checking the external diameters of rod or tubular parts but may also be adapted for measurements or checking of external or internal dimensions of other parts as well.

In use the anvil 33 and yoke stop are adjusted either by the use of standard parts having the desired dimensions or by use of gauge blocks or other suitably sized or measuring devices which allow the yoke stop and anvil to be locked in proper position whereby upon placing of the object to be checked or measured between the wear resistant surfaces 37 or 38 of the anvil 33, depending upon the portion employed, and the upper surface of the pin 27, the dimension of the object may be read directly upon the scale 11a of the indicator when the object or part to be checked is postioned between the top of the pin 27 and the precision abutment face 37 or 38, as the case may be, the movement of the pin 27 results in a rocking of the lever 16 about its pivot 17 and a movement of indicator pin 15 for operating indicator actuating pin 13 and effecting a quick and direct reading of the position of the indicator arm or pointer 12 on the calibrated scale 11a thus giving an immediate reading of the dimension of the object or part.

From the foregoing it will be seen that I have provided simple, efficient and economical means for obtaining all of the objects and advantages of the invention.

Having described my invention, I claim:

1. A device of the character described for use in combination with an indicator and means for accurately transmitting measurements to said indicator, comprising a base, a dial indicator supported on said base, stage means on said base for supporting a member to be gauged or measured and to transmit the measurement thereof to the indicator, a body portion having an opening therein, a sliding pin in said opening, an outwardly extending support on said body portion, an anvil mounted for sliding movement on said outwardly extending portion of said body portion and adapted to engage a portion of the member to be measured or gauged, means for locking said anvil in adjusted position, and a stop member mounted on said body portion and pivotally adjustable relative thereto and having a portion thereof adapted to engage another portion of said member to be measured or gauged, said pivoted stop member comprising a yoke having a pair of spaced leg portions straddling said extension on said body portion and having wear resistant surfaces on each of said leg portions and adapted to engage the member to be gauged or checked and a pivoted lever in said base and adapted to transmit motion of said sliding pin to said dial indicator.

2. A device of the character described for use in combination with an indicator and means for accurately transmitting measurements to said indicator, comprising a base, a dial indicator supported on said base, stage means for supporting a member to be gauged or measured and to transmit the measurement thereof to the indicator, a body portion having an opening therein, a sliding pin in said opening, a support extending outwardly from said body portion, an anvil carried by said support and adjustable relative to said body portion and adapted to engage a portion of the member to be measured or gauged and a stop member pivotally mounted relative to said body portion and support and having a portion thereof adapted to engage another portion of said member or gauge, said pivoted stop member comprising a yoke straddling said support and set screw means for locking said yoke member in adjusted pivoted position relative to said support and a pivoted lever in said base and adapted to transmit motion of said sliding pin to said dial indicator.

3. A device of the character described for use in combination with an indicator and means for accurately transmitting measurements to said indicator, comprising a base, a dial indicator supported on said base, stage means for supporting a member to be gauged or measured and to transmit the measurement thereof to the indicator, a body portion having an opening therein, a sliding pin in said opening, a support extending outwardly from said body portion, an anvil mounted for sliding adjustment on said support and adapted to be adjustable towards and away from said sliding pin to engage a portion of the member to be measured or gauged and a stop member pivotally mounted relative to said body portion having a side portion thereof adapted to engage another portion of said member or gauge, said pivoted stop member comprising a yoke straddling said support and having wear resistant surfaces on those portions of each of the sides of the yoke adapted to engage the member to be gauged or checked, and a threaded member threaded through a portion of said yoke stop and adapted to engage said body portion whereby said yoke member may be secured in adjusted pivoted relation to said support and a pivoted lever in said base and adapted to transmit motion of said sliding pin to said dial indicator.

4. In a device of the character described, an attachment adapted to be secured to a base supporting an indicator and means for accurately transmitting motion to said indicator, said attachment having a portion for securing the same to said base, said attachment having an opening, a sliding pin in said opening adapted to engage said motion transmitting means whereby motion of said sliding pin is transmitted to said indicator, a support extending from said base, a slotted anvil member and a pivotally adjustable stop member, both adjustably mounted on said support, and set screw means in said slot and threaded into said support whereby said anvil member may be locked in adjusted position on said support and means for locking said pivotally adjustable stop member in pivotally adjusted position relative to said support.

5. In a device of the character described, an attachment adapted to be secured to a base supporting an indicator and means for accurately transmitting motion to said indicator, said attachment having a portion for securing the same to said base, said attachment having an opening, a sliding pin in said opening adapted to engage said motion transmitting means whereby motion of said sliding pin is transmitted to said indicator, a support on said attachment, an anvil member and an adjustable stop member, said stop member comprising a yoke straddling said support and mounted for pivotal adjustment relative thereto, and means for locking said adjustable stop member in adjusted position relative to said support, said anvil being secured to said support, and being adjustable relative thereto and means for locking said anvil in adjusted position relative to said support.

6. In a device of the character described, an attachment adapted to be secured to a base supporting an indicator and means for accurately transmitting motion to said indicator, said attachment having a portion for securing the same to said base, said attachment having an opening, a sliding pin in said opening adapted to engage said motion transmitting means whereby motion of said sliding pin is transmitted to said indicator, a support on said base, an anvil member and an adjustable stop member, said anvil being adjustably mounted on said support, and means whereby said anvil member and adjustable stop member may be locked in adjusted position, said adjustable stop member comprising a yoke pivotally mounted on said attachment adjacent said opening for said pin member with the opposite sides of said yoke straddling said support and adapted to engage a member to be measured or gauged by the device and a threaded member for locking said pivoted yoke in adjusted position.

7. In a device of the character described, an attachment adapted to be secured to a base supporting an indicator and means for accurately transmitting motion to said indicator, said attachment having a portion for securing the same to said base, said attachment having an opening, a sliding pin in said opening adapted to engage said motion transmitting means whereby motion of said sliding pin is transmitted to said indicator, a support on said base, an anvil member and an adjustable stop member, and means whereby said anvil member and adjustable stop member may be locked in adjusted position relative to said support, said adjustable stop member comprising a yoke pivotally mounted on said attachment adjacent said opening for said pin member with the opposite sides of said yoke straddling said support and adapted to engage a member to be measured or gauged by the device, said anvil and yoke having wear resistant surfaces on the portions thereof adapted to engage the member to be measured or gauged by said device.

WALTER K. DOW.

(References on following page)

REFERENCES CITED

The following references are of record in the file of this patent:

UNITED STATES PATENTS

| Number | Name | Date |
|---|---|---|
| 1,478,954 | Hardaker | Dec. 25, 1923 |
| 1,648,428 | Stacy | Nov. 8, 1927 |
| 1,678,030 | Yount | July 24, 1928 |
| 1,768,931 | Pratt | July 1, 1930 |
| 2,201,832 | Kaehlert | May 21, 1940 |
| 2,249,904 | Lewis | July 22, 1941 |
| 2,270,728 | Foster | Jan. 20, 1942 |
| 2,409,280 | Hohwart | Oct. 15, 1946 |
| 2,419,406 | Koebbe | Apr. 22, 1947 |

FOREIGN PATENTS

| Number | Country | Date |
|---|---|---|
| 132,707 | Great Britain | Sept. 25, 1919 |
| 394,663 | Great Britain | June 28, 1933 |
| 541,129 | Great Britain | Nov. 13, 1941 |